Aug. 18, 1964 C. W. HOOVER, JR 3,145,368

ELECTROLUMINESCENT STORAGE AND READOUT SYSTEM

Filed Nov. 16, 1959 3 Sheets-Sheet 1

INVENTOR
C. W. HOOVER, JR.
BY
R. C. Winter
ATTORNEY

INVENTOR
C. W. HOOVER, JR.
BY
R. C. Winter
ATTORNEY

INVENTOR
C. W. HOOVER, JR.
BY
R. C. Winter
ATTORNEY 3,145,368
Patented Aug. 18, 1964

3,145,368

ELECTROLUMINESCENT STORAGE AND READOUT SYSTEM

Charles W. Hoover, Jr., Summit, N.J., assignor to Bell Telephone Laboratories, Incorporated, New York, N.Y., a corporation of New York Filed Nov. 16, 1959, Ser. No. 853,043
8 Claims. (Cl. 340—173)

This invention relates to information storage systems and more particularly to the use of electroluminescent devices in systems for storage of large quantities of relatively permanent information.

For various applications it is desirable to have available a medium capable of storing a large quantity of information which requires change at relatively infrequent intervals. Various storage systems in present use meet the large capacity requirement by employing multiple reading devices each having access to a fixed amount of the storage surface, by moving the storage surface across the path of the reading device such as on a revolving drum, or by employing a cathode ray tube for scanning across a fixed storage surface.

An example of the latter system is disclosed in R. C. Davis and R. E. Staehler Patent No. 2,830,285, issued April 8, 1958. In this instance, light produced by impingement of the electron beam in a cathode ray tube on a luminescent target is applied selectively to a discrete area of a photographic film storage surface, and a light-sensitive device determines the stored information in accordance with the amount of light reaching the device through the discrete area of the film.

An alternative arrangement in accordance with this invention substitutes an electroluminescent matrix for the cathode ray tube light source. It is known that certain types of phosphors emit light when in the presence of an electric field. Consequently, a layer of such electroluminescent material sandwiched between mutually orthogonal arrays of spaced electrical conductors forms a matrix which will provide a light spot at a selected crosspoint of the matrix conductors when a discrete potential is applied to each conductor leading to the crosspoint.

Although efficient electroluminescent phosphors in which brightness levels approaching those obtainable with cathode ray tubes have been available for some time, the use of such a matrix as the light source in a high speed, permanent memory, read-out system heretofore has not proven satisfactory. In such an arrangement the selecting voltages are applied to electrical conductors in contact with strips of the electroluminescent material in order to gain access to a preselected crosspoint of the matrix. Thus the access strips are energized so as to provide a total light output at one level while the material at the selected crosspoint provides a slightly higher light level.

As the output light-sensitive device in the memory readout system observes all of the light transmitted from the light source through the storage medium, it will necessarily be affected by the light present at the access strips of the matrix other than at the crosspoint. Thus in order to ascertain the information present at any discrete area of the screen under all possible storage conditions, it is necessary for the output light detection device to discriminate between the light transmitted from any crosspoint of the matrix and the total of the light emitted by all elements in the access paths to the chosen crosspoint.

The brightness at the surface of each element increases with increasing input signal voltage, but at the same time the discrimination ratio, which is the ratio of the crosspoint brightness to access element brightness, decreases with increasing input signal voltage. For this reason, electroluminescent screens operating at high input voltage levels must be limited to very few crosspoints, and consequently small storage capacity, in order to satisfy the discrimination requirement.

The detection situation may be improved somewhat by decreasing the applied voltage, thereby decreasing the brightness levels at the screen. However, this has the disadvantage of requiring larger areas for the individual electroluminescent elements in order to provide adequate brightness levels for accurate readout in a reasonable time. In fact, it has been found that where high speed memory readout is required, individual element sizes measured in square feet would be required in screens having one million elements. This may be contrasted with the fact that the light necessary for proper readout may be obtained through a storage element having an area of a few square mils if the restriction on the ratio of crosspoint light to access element light could be overcome or greatly reduced.

It is an object of this invention to provide an improved storage system.

It is another object of this invention to improve the speed, accuracy and reliability of large scale information storage systems utilizing a compact, electroluminescent, read-out system.

It is a further object of this invention to provide a simple, rugged and economical electroluminescent storage and read-out system.

These and other objects of my invention are attained in accordance with illustrative embodiments of the invention in which an information storage plate or slide is positioned between an electroluminescent matrix and a light-sensitive output device. Selection and activation of a matrix crosspoint are achieved by application of distinct frequency signals in each coordinate. Advantageously the slide is positioned sufficiently close to the matrix so that light produced at any crosspoint of the matrix will impinge a single corresponding information storage area on the slide. The light-sensitive device in turn is positioned so as to detect all light passing through the slide and serves to convert this light into electrical signals which are transmitted through output tuned circuits.

The electroluminescent material acts as a light modulator in that its light output bears a nonlinear relationship to the applied voltage. Therefore, with distinct frequency signals applied to an access row and column simultaneously, the light from the crosspoint is modulated in intensity at the sum and difference of the input frequencies and multiples thereof, while the light emitted along the access row and column is modulated only at their respective input signal frequencies and multiples thereof. Thus by properly adjusting the output tuned circuit, the crosspoint output may be detected at the sum or difference frequency of the coordinate access input signal frequencies. In this fashion only the light emanating from the crosspoint selected by the input circuitry is observed and recorded, and the problem encountered in discriminating between the light emanating from the crosspoint and that from the access row and column of the electroluminescent matrix is overcome.

In accordance with one aspect of the invention, the circuit may be arranged so as to perform various logic operations. This entails the application of a plurality of distinct frequency input signals in one coordinate of the input circuitry and the provision of a corresponding plurality of output circuits tuned so as to distinguish particular sum or difference frequencies produced at various crosspoints. Such multifrequency access may also be employed to read from several storage areas in an information storage medium simultaneously. Despite such plural readout, only a single light-sensitive device connected to the output circuit is required.

The use of such a read-out scheme also permits improvement in signal-to-noise ratio through the use of frequency dispersion techniques in the output circuit in conjunction with pulse input signals. Such an improvement in turn permits a reduction in the total light output required from each element of the electroluminescent matrix, and thus operation at lower input voltage levels may be realized. Such dispersion techniques, as disclosed, for example, in S. Darlington Patent 2,678,997, serve to shorten the frequency modulated pulses received from the light-sensitive device, thereby increasing their peak power and consequently the signal-to-noise ratio.

It is significant that the wide spacing obtainable between input and crosspoint output frequencies permits a high level of frequency selectivity in the output in low Q tuned circuits. Thus precise input frequencies are not critical and some drift may be tolerated. However in applications demanding an accurate correlation between input and crosspoint output frequencies, the circuit in accordance with another aspect of the invention may be adapted to satisfy this requirement by connecting the input signal leads to a circuit including a crystal mixer arranged to produce signals at the precise difference frequency of the input signal frequencies and by applying the resultant to a frequency multiplier circuit connected to the light-sensitive device in the output circuit.

It is a feature of this invention that an information storage and read-out system comprising an electroluminescent matrix light source, an information storage plate, and a light-sensitive device for receiving light from the electroluminescent matrix through the information storage plate include a tuned circuit connected to the light-sensitive device and means for applying distinct frequency input signals to the respective coordinate inputs of the electroluminescent matrix light source, the output tuned circuit being adjusted so as to distinguish the respective input signal frequencies from their sum or difference frequency.

It is another feature of this invention that a plurality of distinct frequency input signals be applied in at least one coordinate of the electroluminescent matrix light source.

It is a feature in accordance with one aspect of this invention that a plurality of tuned circuits be connected in series to the output of the light-sensitive device, each such circuit being tuned to a particular sum or difference frequency corresponding to the sum or difference frequency of each pair of coordinate input signals.

It is a further feature in accordance with another aspect of this invention that the output tuned circuits be connected to the light-responsive device by a frequency-dispersive circuit.

It is a feature in accordance with a further aspect of this invention that a circuit for reproducing a desired one of the crosspoint output frequencies be connected between the matrix input leads and a function multiplier connected to the output of the light-sensitive device.

A complete understanding of this invention and of the above-noted and other features thereof may be gained from consideration of the following detailed description and the accompanying drawing, in which.

Figure 1:
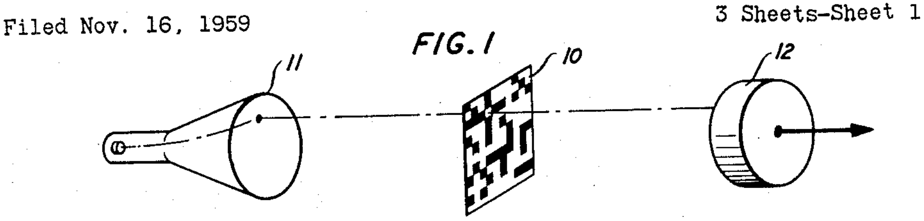
FIG. 1 is a diagram of an information storage and read-out system representative of the prior art.

Referring now to the drawing, the system depicted in FIG. 1 is representative of the prior art and is in accordance with the system disclosed in the aforementioned R. C. Davis et al. patent. As there depicted, the system comprises an information storage slide 10 which has a coating of a suitable photoemulsion applied to a transparent base, such as a glass plate, and patterns of opaque and nonopaque areas are formed in the emulsion on the slide by selective exposure to light in accordance with binary information which it is desired to store in the system.

In operation the information storage slide 10 is impinged at preselected information storage areas in sequence. In this instance a cathode ray tube source 11 is provided. The surface of the cathode ray tube 11 is coated with a luminescent material such that when the electron beam is deflected so as to impinge a predetermined position on the face of the tube, a light beam will be transmitted from this position so as to impinge the desired discrete area of the storage plate 10. A series of light-sensitive devices such as device 12 observes the light from the screen of the cathode ray tube 11 which passes through the information slide 10. Of course this will occur only when the discrete area impinged by the light beam is transparent. In this fashion the output circuit readily distinguishes the particular binary information stored at the interrogated discrete area of the information storage slide 10.

Figure 2:
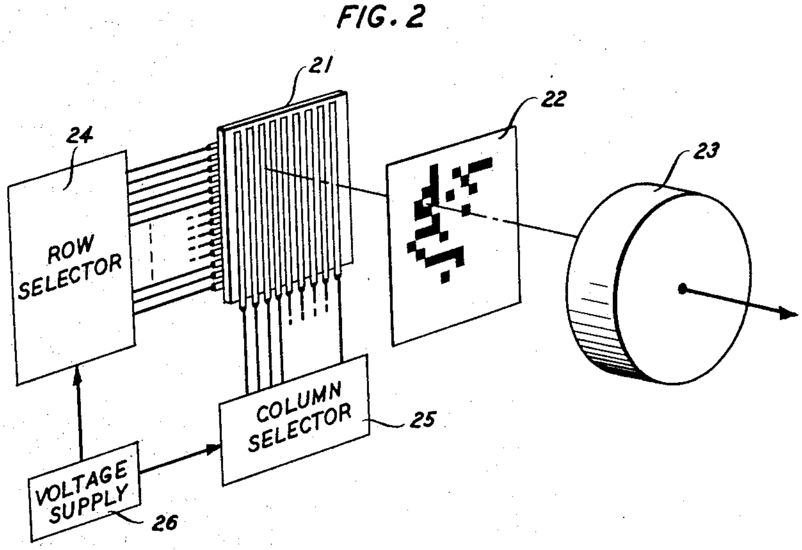
FIG. 2 is an arrangement of the circuit of FIG. 1 in which an electroluminescent matrix light source is substituted for the cathode ray tube light source of the prior art system.

The circuit in FIG. 2 substitutes an electroluminescent matrix 21 for the cathode ray tube light source 11 in the system depicted in FIG. 1. In this instance the information storage slide 22 and the light-sensitive output device 23 correspond in function to components 10 and 12 in the system of FIG. 1. Thus, in order to satisfy the requirements of the storage and read-out system of the prior art, the electroluminescent light source must provied a beam of light at each area corresponding to the storage areas of the information storage slide 22 of sufficient brightness to satisfy the requirements of the light-sensitive device 23. The adoption of such an electroluminescent matrix of course permits construction of a more compact and rugged system than that permitted by the system of FIG. 1. Thus the adoption of such a matrix would be beneficial if the other requirements of the system were met.

Rapid access to the stored information is gained through a coordinate selection system comprising row selector 24 and column selector 25. An input signal from an alternating voltage source 26 is applied simultaneously to the horizontal coordinate row and the vertical coordinate column of the electroluminescent matrix having the preselected crosspoint in common. In this instance the electroluminescent material at the crosspoint emits light at a level determined by the sum of the voltages applied in each coordinate.

The output light-sensitive device 23 requires a certain minimum brightness level to assure accurate output signals from the system, and the application of appropriate input signals to provide the requisite crosspoint light output is easily implemented. However, it is necessary to take into account the fact that the input voltage also appears across each element in the respective access row and column, thereby causing emission of a finite amount of light therefrom, as well as from the preselected crosspoint. A strongly nonlinear relationship exists between the brightness of light emitted from the activated matrix elements and the magnitude of the applied voltage such that each coordinate access element emits considerably less light than the crosspoint element. However, in order to achieve the requisite accuracy of such a storage and read-out system, it is necessary that the light-sensitive device 23 be able to discriminate between the light received from the preselected crosspoint through the information storage slide 22 and the total light received from the access row and column of the information storage slide 22. This in turn requires that the system satisfy the extreme boundary conditions indicated in FIG. 3.

Figures 3A, 3B:
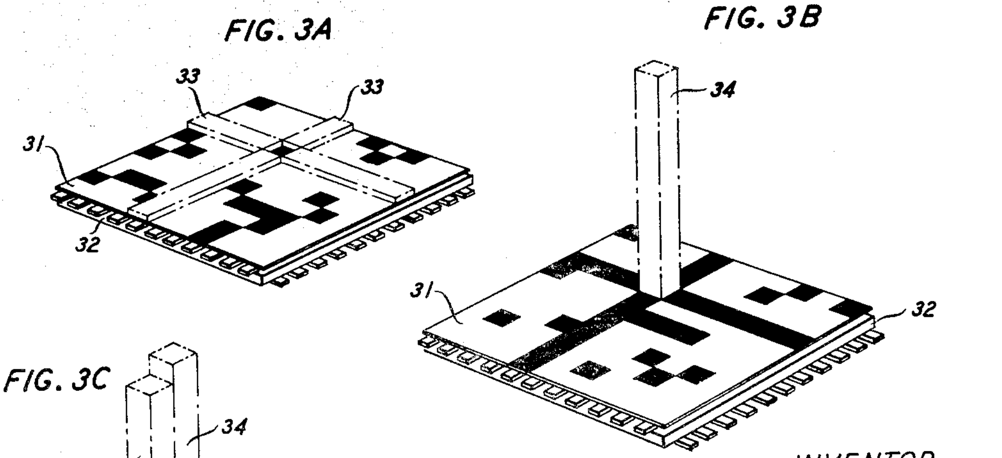
FIGS. 3A, 3B and 3C are diagrams indicating the light transmitted through the information storage plate of the system depicted in FIG. 2 in two extreme situations.
Figure 3C:
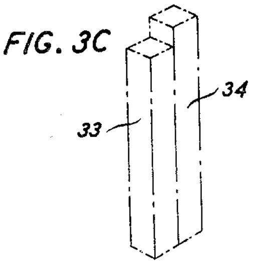

In each example illustrated in FIG. 3, the information storage slide 31, with its various transparent and opaque discrete information storage areas considerably enlarged for ease of identification, is indicated as receiving light from a particular access row and column of the electroluminescent matrix 32. In FIG. 3A the particular information storage area corresponding to the selected matrix crosspoint is opaque, while all of the other information storage areas corresponding to the coordinate access row and column of the matrix 32 are transparent. The relative level of light received through the information storage slide is indicated by the raised portion on the surface of the slide and the total light received by the corresponding column in FIG. 3C. It is this amount of light to which the light-sensitive device must respond with an output signal indicative of the binary condition corresponding to an opaque area on the information storage slide.

On the other hand, as indicated in FIG. 3B, the output light-sensitive device must provide the opposite binary output indication in response to receipt of light through a transparent area on the information storage slide 31 corresponding to a preselected crosspoint of the matrix 32 which is present in an access row and column for which all of the other corresponding information storage areas are opaque. As is readily apparent from FIG. 3C, the amount of light received through such an area, as represented by the raised portion 34 in FIGS. 3B and 3C, is only slightly larger than the total amount of light 33 received from the access row and column of FIG. 3A such that a light-sensitive device must be made extremely sensitive in order to assure accurate discrimination in every instance. A device satisfying this requirement is of course difficult, if not impossible, to attain when the other criteria such as speed of operation and size of the information storage areas are considered. If, for example, the matrix at distince frequencies $f_1$ and $f_2$ and connecting the light-from the crosspoint would remain constant while the light from the access row and column would increase in proportion to the increase in matrix dimensions. Thus discrimination in this instance would be impossible.

Figure 4:
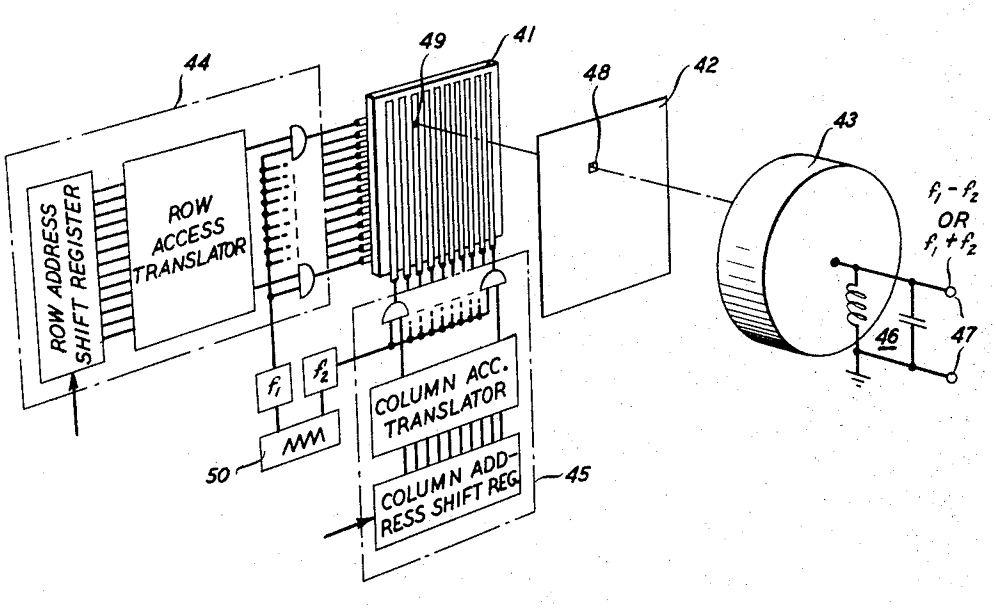
FIG. 4 is a representation, partially in schematic form, showing particular elements and their arrangement in a system in accordance with one specific illustrative embodiment of this invention.

In accordance with the embodiment of the invention depicted in FIG. 4, I have found that the discrimination problem may be overcome by applying the requisite coordinate input signals to the electroluminescent matrix at distinct frequencies $f_1$ and $f_2$ and connecting the light-sensitive device 43 to at least one resonant circuit 46 which advantageously may be tuned so as to shunt to ground all signal frequencies other than the sum or difference of the coordinate input signal frequencies. The selected frequency thereupon appears at the output terminal 47 where it may be detected. Thus the coordinate input selection circuits 44 and 45 are unchanged with the exception that an input signal voltage at a first distinct frequency $f_1$ is applied to the selected coordinate row, and an input signal voltage at a second distinct frequency $f_2$ is applied to the selected coordinate column. Such selection circuitry as known in the art may comprise a shift register and translator for each coordinate, as illustrated in FIG. 4, the registers storing information necessary to define a row and column and the translators being activated by the output from the registers to select the particular desired row and column. The signal from the translator advantageously may be connected so as to gate an input signal at the desired frequency to the selected row or column of the matrix.

The output light-sensitive device 43 may comprise a phototube and amplifier arrangement, as known in the art, which arrangement suitably transforms the received light into electrical impulses which are in turn delivered to the tuned circuit 46. The tuned circuit of course may comprise any of the well-known combinations of inductance and capacitance as required to detect an output signal only at the desired frequency, which in this instance is the sum of or difference between the coordinate input signal frequencies $f_1$ and $f_2$ or multiples thereof.

Only the preselected crosspoint provides light at these sum and difference frequencies. Thus only the light received by the light-sensitive device 43 from the preselected crosspoint of the matrix 41 through desired discrete area of the information storage slide 42 is registered in the output circuitry connected to terminal 47. It is evident, therefore, that the magnitude of the input signal voltages and the discrimination ability of the output light-sensitive device 43 are no longer critical, and an electroluminescent matrix may be constructed to accommodate a large scale information storage slide.

A typical operation of my novel circuit will further illustrate its advantages. Consider, for example, that it is desired to determine what information is stored at the discrete area 48 of the information storage slide 42. The electroluminescent matrix 41 is positioned sufficiently close to the information storage slide 42 or a suitable optical system is provided between them so as to direct light from the crosspoint 49 of the electroluminescent matrix so as to impinge only the discrete area 48. Activation of crosspoint 49 is realized through the application of input signals to the access row and column which define the crosspoint 49 in the matrix 41. Thus the horizontal or row selection circuitry 44 is operated so as to apply an input signal voltage at a frequency $f_1$ to the matrix row conductor in contact with one side of the electroluminescent material at the crosspoint 49, and the vertical selection circuitry 45 is activated so as to provide an input signal voltage at a frequency $f_2$ to the matrix column conductor in contact with opposite side of the electroluminescent material at the crosspoint 49. Due to the nonlinear response of the electroluminescent material, this results in modulation of light from the selected row at a frequency $f_1$, $2f_1$, $3f_1$, et cetera, from the column 45 at a frequency $f_2$, $2f_2$, $3f_2$, et cetera, and from the crosspoint 43 at frequencies $f_1+f_2$ and $f_1-f_2$ and multiples thereof.

Assuming, further, that the interrogated information storage area 48 is transparent, as well as a number of elements in the corresponding row and column of information storage areas containing the discrete area 48, the light-sensitive device 43 will receive light modulated at frequencies $f_1$, $f_2$, $f_1+f_2$, $f_1-f_2$ and their multiples. All of this light, of course, is transformed into electrical impulses in that the light-sensitive device itself is not frequency discriminative. Consider, however, that in this example the tuned circuit 46 is designed so as to block only the frequency corresponding to $f_1-f_2$. Thus an accurate indication is provided at the output terminal 47 indicating that the discrete area 42 is storing the particular binary information corresponding to a transparent area. Should this area be opaque, it is evident that no signal would appear at the output terminal 47 in that light modulated at the frequency $f_1+f_2$ would not be received by the light-sensitive device 43, and thus the binary indication equivalent to an opaque area would be registered in the output circuitry at this time.

Figure 5:
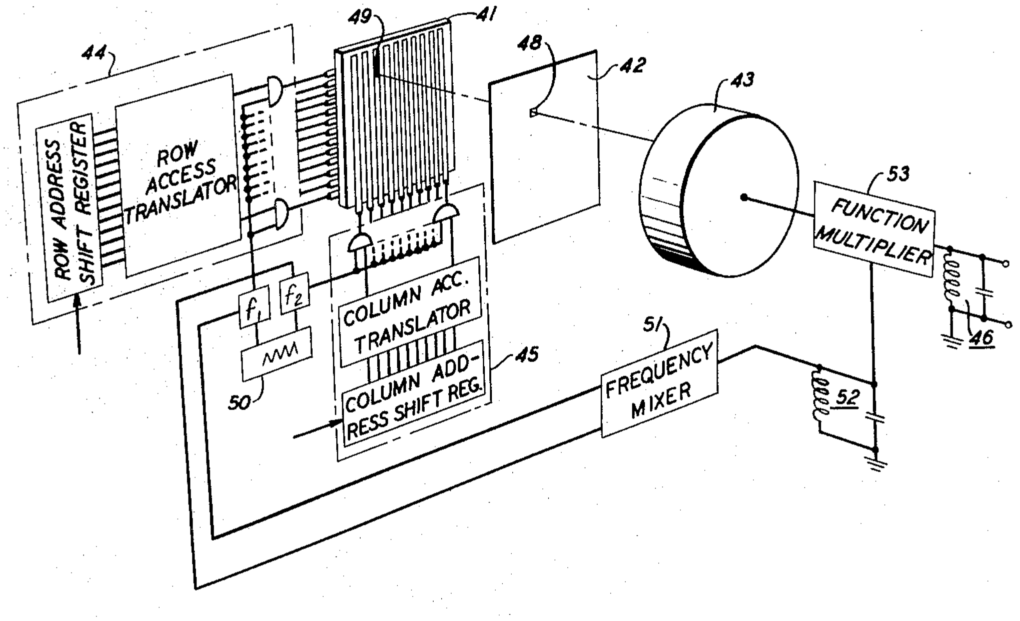

It is convenient to provide the distinct frequency input signals in pulse or continuous wave form, as desired, from a single source such as a sawtooth generator 50 with suitable input tuned circuits, designated $f_1$ and $f_2$ in FIG. 4, connected between the source 50 and the respective row and column access conductors. Certain applications require precise stability of the input signal frequencies, and for these applications, as indicated in the circuit of FIG. 5, the signals from $f_1$ and $f_2$ may be applied to a mixer circuit 51 comprising a piezoelectric crystal, as known in the art, which in turn transmits the precise difference frequency, as derived from the tuned circuit 52, to a function multiplier circuit 53, as known in the art, connected to the output of the light-sensitive device 43. In this fashion the desired crosspoint output signal frequency is magnified through its multiplication with the input signal frequencies producing it, and a highly stable operation is achieved.

Figure 6:
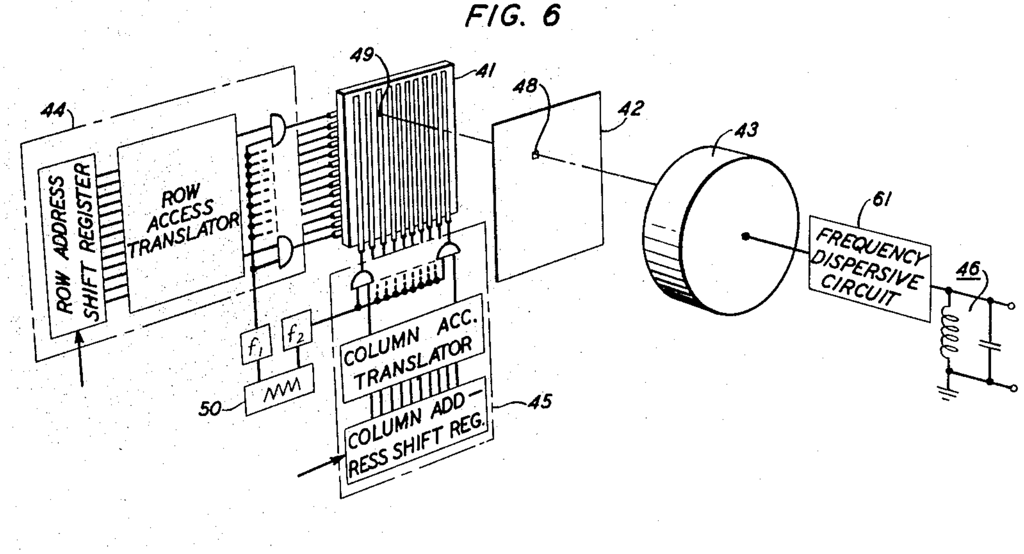

The circuit, in accordance with another aspect of the invention, may also employ frequency dispersion techniques in the output circuit to advantage when pulse input signals are applied. Thus, as illustrated in FIG. 6, a frequency-dispersive network 61 comprising, for example, an acoustic delay line or a lumped constant, all pass filter network may be connected to the light-sensitive device 43 so as to receive frequency modulated signals resulting from the pulse input signals. As indicated in the aforementioned Darlington patent, the dispersive network 61 imposes varied phase delays over the range of received frequencies, so that different portions of a pulse, being at different frequencies, are delayed by different amounts. The resultant shorter pulses are increased in peak power with a consequent increase in signal-to-noise ratio. This in turn permits operation of the electroluminescent matrix at appreciably lower voltage levels with its attendant advantages.

Figure 7:
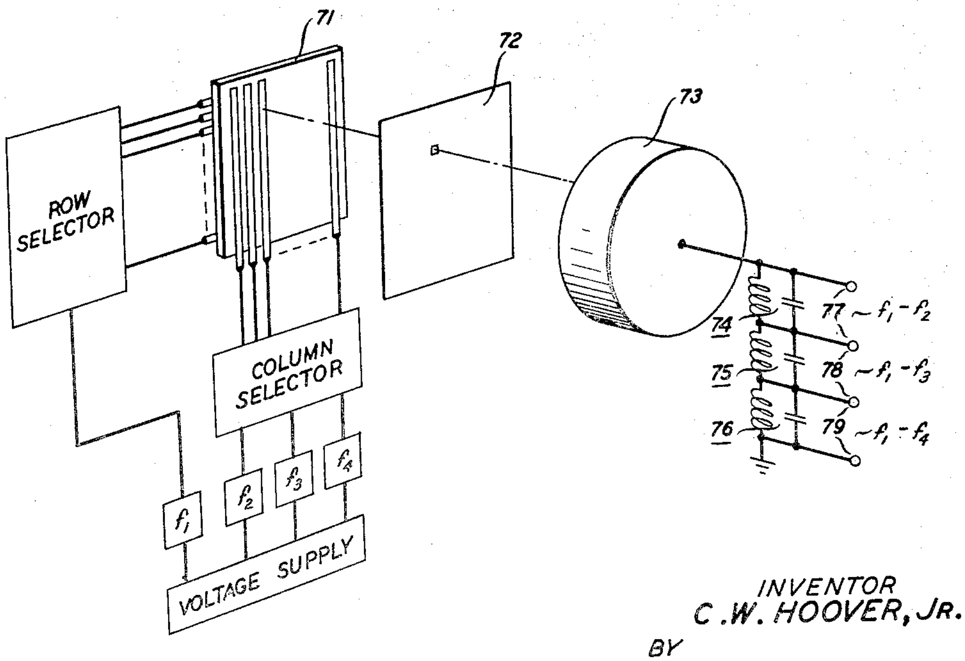
FIGS. 5, 6 and 7 are representations, partially in schematic form, indicating various aspects of the invention.

The circuit in accordance with this invention also is readily adaptable to use in other information read-out systems. Thus, as illustrated in FIG. 7, a single frequency $f_1$ may be applied to a preselected row of the electroluminescent matrix 71, while a plurality of distinct frequencies such as $f_2$, $f_3$ and $f_4$ may be applied simultaneously to corersponding columns of the matrix. The output circuitry in this instance comprises a plurality of resonant circuits 74–76 corresponding in number to the distinct column input frequencies, each such circuit being tuned so as to select the particular sum or difference frequency of the input row signal and the respective input column signals.

The presence of the information storage slide 72 in the circuit of FIG. 5, employing multifrequency access, permits utilization of the circuit for reading the information stored in a plurality of discrete areas simultaneously. In this fashion a plural digit binary word may be detected at the terminal pairs 77–79, each terminal pair providing the binary information stored in a distinct area of the information storage slide 72.

It is to be understood of course that the system is not restricted in the number of different frequency input signals nor in the corresponding output tuned circuits and their connection. In addition, the above-described arrangements are merely illustrative of the application of the principles of the invention. Numerous other arrangements may be devised by those skilled in the art without departing from the spirit and scope of the invention.

What is claimed is:

1. An information storage and read-out system comprising an electroluminescent device having access conductors arranged in rows and columns and defining a plurality of access crosspoints, means for selecting a row and a column conductor, means for applying an input signal at a first frequency to the selected row conductor, means for applying an input signal at a second frequency to the selected column conductor, an informaion storage slide positioned to receive light from said electroluminescent device, light-sensitive means for generating electrical signals in response to the light transmitted from said electroluminescent device through said slide, and a tuned circuit connected to said light-sensitive device and resonant at one of te distinct frequencies of light emitted from the crosspoint of said selected access row and column conductors.

2. An electrical circuit comprising an electroluminescent device having row and column arrays of conductors in contact with opposite surfaces of a layer of electroluminescent material, means for applying a first frequency signal to a selected one of said row conductors, means for applying a plurality of distinct frequency signals to a corresponding number of selected column conductors, light-sensitive means positioned to receive light from said electroluminescent device, and output means connected to said light-sensitive means for determining the coincidence of signals on said selected row conductor and one of said selected column conductors, said output means comprising a resonant circuit tuned to the frequency sum or difference of said signals applied to said selected row conductor and said one of said selected column conductors.

3. An electroluminescent storage system comprising an electroluminescent device having access conductors arranged in coordinate rows and columns, means for applying access signals of one frequency to said row conductors, means for applying access signals of a different frequency to said column conductors, an information storage slide having information stored thereon as areas of different opacity, light-sensitive means for generating electrical signals in response to light transmitted from said electroluminescent device through said informaion storage slide, and output circuit means connected to said light-sensitive means and responsive to a modulation product of said first and second frequencies.

4. An information storage and read-out system comprising a matrix having a layer of electroluminescent material, a plurality of row conductors in contact with one side of said layer and a plurality of column conductors in contact with the opposite side of said layer, an oscillator, means connected to said oscillator for generating signals at a plurality of frequencies derived from the frequency of said oscillator, gating means connected to said generating means for applying a signal at a first frequency to a selected one of said row conductors, and for applying a signal at a second frequency to a selected one of said column conductors, a slide having binary information stored thereon as opaque and transparent discrete areas, light-sensitive means positioned to receive light from said matrix through said slide, and output means connected to said light-sensitive means comprising a distinct circuit tuned to the frequency sum or difference of said first and second frequencies.

5. An electrical circuit comprising an electroluminescent matrix having a plurality of row and column conductors in contact with opposite sides of an electroluminescent layer and producing light in said layer at one level along the energized row and column conductors and at another level at the crosspoints of the energized row and column conductors, means for applying a first frequency signal to a selected one of said row conductors, means for applying a second frequency signal to a selected one of said column conductors, a light-sensitive device for generating electrical signals in response to light received from said matrix, and means connected to said light-sensitive device for discriminating between the frequency of the electrical signals produced by light from said layer at the crosspoint of said selected row and column conductors and that produced by the light from said layer along said energized row and column conductors.

6. An electrical circuit in accordance with claim 5 and further comprising frequency-dispersive means connected between said light-sensitive device and said frequency-discriminating means.

7. An electrical circuit in accordance with claim 5 and further comprising multiplying means connected to said light-sensitive means and frequency-stabilizing means connected between said first and second frequency signal-applying means and said multiplying means.

8. In an electroluminescent storage system, an electroluminescent device including coincident voltage access means, a storage slide adjacent said device and having information stored thereon as areas of different opacity, light-sensitive means responsive to light from said electroluminescent device through said slide for generating electrical signals, and means for distinguishing between light transmitted through said slide due to occurrence of coincident voltages at a particular area of said electroluminescent device and the sum of light transmitted through said slide because of non-coincident voltages applied to other areas of said electroluminescent device, said distinguishing means including means for causing said coincident voltage means to apply a first voltage of one frequency and a second voltage of a different frequency to said electroluminescent device and means connected to said light-sensitive means responsive to a modulation product of said first and second frequencies.

References Cited in the file of this patent

UNITED STATES PATENTS

| | | |
|---|---|---|
| 2,796,584 | Hurvitz | June 18, 1957 |
| 2,803,285 | Davis et al. | Apr. 8, 1958 |
| 2,877,376 | Orthuber | Mar. 10, 1959 |
| 2,958,074 | Kilburn et al. | Oct. 25, 1960 |